US009688230B2

(12) United States Patent
Makita

(10) Patent No.: US 9,688,230 B2
(45) Date of Patent: Jun. 27, 2017

(54) VEHICLE SEAT INCORPORATING SIDE AIRBAG

(71) Applicant: TACHI-S CO., LTD., Akishima-Shi, Tokyo (JP)

(72) Inventor: Naoyuki Makita, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 14/905,882

(22) PCT Filed: Apr. 7, 2014

(86) PCT No.: PCT/JP2014/060054
§ 371 (c)(1),
(2) Date: Jan. 18, 2016

(87) PCT Pub. No.: WO2015/011958
PCT Pub. Date: Jan. 29, 2015

(65) Prior Publication Data
US 2016/0159305 A1 Jun. 9, 2016

(30) Foreign Application Priority Data
Jul. 22, 2013 (JP) .................................. 2013-151452

(51) Int. Cl.
B60R 21/207 (2006.01)
B60N 2/58 (2006.01)
B60R 21/2165 (2011.01)

(52) U.S. Cl.
CPC .......... *B60R 21/207* (2013.01); *B60N 2/5883* (2013.01); *B60R 21/2165* (2013.01); *B60N 2002/5808* (2013.01)

(58) Field of Classification Search
CPC . B60R 21/207; B60R 21/2165; B60N 2/5883; B60N 2002/5808
See application file for complete search history.

(56) References Cited

U.S. PATENT DOCUMENTS

2011/0095578 A1* 4/2011 Festag .................. B60R 21/207
297/216.1
2013/0187416 A1* 7/2013 Nakata .................. D05B 23/00
297/216.13

(Continued)

FOREIGN PATENT DOCUMENTS

JP 2009035089 A 2/2009
JP 2009051480 A 3/2009

(Continued)

OTHER PUBLICATIONS

International Search Report corresponding to Application No. PCT/JP2014/060054; Date of Mailing: Jul. 8, 2014, with English translation.

*Primary Examiner* — Drew J Brown
(74) *Attorney, Agent, or Firm* — Cantor Colburn LLP

(57) ABSTRACT

A vehicle seat incorporating a side airbag includes a seat cushion and a seat back, if an impact is detected at that side of the seat back, the inflator is activated, generating high-pressure gas, the gas gushes in the airbag, inflating the airbag, and the airbag so inflated tears up the sewn part of the seat back, which are positioned at the front part of the vehicle wall side of the seat back, and develops to the side and front of the occupant, isolating the occupant from the vehicle wall and protecting the occupant; and the airbag is secured to the inner side of the side frame on the vehicle wall side, an expansion restriction plate is provided on the inner side of the airbag, and the airbag is sandwiched between the side frame on the vehicle wall side and the expansion restriction plate.

2 Claims, 4 Drawing Sheets

(56) References Cited

U.S. PATENT DOCUMENTS

| | | | | |
|---|---|---|---|---|
| 2013/0257120 A1* | 10/2013 | Tracht | ................... | B60R 21/207 297/216.13 |
| 2015/0076802 A1* | 3/2015 | Tanabe | ..................... | B60N 2/68 280/730.2 |
| 2015/0251623 A1* | 9/2015 | Fujiwara | ............... | B60R 21/207 280/728.2 |
| 2015/0336528 A1* | 11/2015 | Tanabe | .................. | B60R 21/207 280/728.2 |

FOREIGN PATENT DOCUMENTS

| | | | | |
|---|---|---|---|---|
| JP | 2009143379 A | | 7/2009 | |
| JP | 2011056979 A | | 3/2011 | |
| JP | 2011068198 A | | 4/2011 | |
| JP | 2015101297 A | * | 6/2015 | ........... B60R 21/207 |

* cited by examiner

VEHICLE SEAT INCORPORATING SIDE AIRBAG

CROSS REFERENCE TO RELATED APPLICATIONS

This is the U.S. national stage of application No. PCT/JP2014/060054 dated Apr. 7, 2014. Priority under 35 U.S.C. §119(a) and 35 U.S.C. §365(b) is claimed from Japanese Patent Application No. 2013-151452, filed Jul. 22, 2013, the entire contents of which are incorporated herein by reference.

BACKGROUND OF THE INVENTION

1. Field of the Invention

This invention relates to a vehicle seat incorporating an airbag (i.e., side airbag) at one side of the seat back.

2. Description of the Related Art

The vehicle seat comprises a seat cushion and a seat back coupled at lower edge to the rear edge of the seat cushion. In most cases, the seat back can be inclined by means of a reclining device.

A spring assembly has, for example, many S springs used as shock absorbing members, which are stretched in a frame (i.e., seat back frame). The frame is covered with a pad (i.e., seat pad) made of plastic foam, thereby forming a seat back unit. The seat back unit is covered with a trim cover (surface sheet), whereby a seat back is formed.

Vehicle seats incorporating a side airbag are widely known. If another vehicle hits the vehicle at side, the airbag provided at the vehicle wall side of the vehicle seat will inflate and develop, reducing the impact to the occupant and thus protecting the occupant.

Of a vehicle seat of this type, the two trim cover strips (i.e., forward and rearward strips) of the trim cover are sewn at the front parts of the sides of the seat back. At the back of the sewn parts of the trim cover, the pad of the seat back has a space (a side space) in which an airbag (side airbag) is arranged.

The airbag (side airbag) incorporates a micro gas generator called inflator, is folded in front of the inflator, and is contained in a substantially rectangular case. The airbag contained in the case is secured to one side frame provided at the vehicle wall side of the seat back frame. The airbag is arranged and incorporated in the space made in the pad (i.e., space in the side part of the seat back). The seat has an impact sensor. The impact sensor detects an impact at a side of the vehicle if another vehicle hits the vehicle at that side. Then, the inflator is activated, generating gas (high-pressure gas). The gas gushes in the airbag and inflates the airbag. So inflated, the airbag first breaks the pad and then tear up the sewn part of the trim cover on the vehicle wall side. The airbag then inflates at the vehicle wall side and to the fore-side of the occupant. As a result, the airbag isolates the occupant from the vehicle wall. The pad that is adjacent to the sewn parts of the trim cover is made thin in most cases, and can easily provide a passage (development passage) through which the airbag may reach the sewn parts of the trim cover.

In most cases, the seat back frame is composed of upper and lower frames and left and right side frames, all made of steel plates or steel pipes, and is a rectangular frame as seen in the plan view. The left and right side frames extend in forward direction.

As seen also from FIG. 3 of JP 2009-035089A, the airbag is provided at the vehicle wall side and secured to the outside of the seat back. More precisely, the airbag is secured to the outside of the side frame on the vehicle wall side of the seat back frame, and is incorporated in the side space of the seat back. That is, the airbag is fastened to the outside of the side frame on the vehicle wall side, and the side frame is located inside the airbag. Located inside the airbag, the side frame controls (or interrupts) the airbag, preventing the airbag from developing toward the occupant. Inevitably, the airbag develops in a specific passage extending toward the sewn parts of the trim cover, which exist at the front side parts of the seat back.

Patent Literature: Japanese Patent unexamined Publication JP 2009-035089A

As descried above, in the vehicle seat incorporating a side airbag, the side airbag is provided outside of the side frame on the vehicle wall side. The airbag is controlled (or interrupted) by side frame and cannot develop toward the occupant of the vehicle seat. The airbag therefore develops in a specific passage that extends, on the vehicle wall side, toward the sewn parts of the trim cover. However, a space for the airbag is provided in the pad of the seat back, and the airbag is arranged in the space and covered with the trim cover. Further, the trim cover covers the pad of the vehicle seat. The side of the seat back inevitably bulges outward at the vehicle wall side where the airbag is located. Hence, the vehicle wall side part of the seat back, where the airbag is provided, differs in shape from the vehicle inner part of the seat back, where no airbag is provided. Consequently, the left and right sides of the seat back will differ in design.

The object of this invention is to provide a vehicle seat incorporating a side airbag at one side of the seat back, without making any design difference between the left and right sides of the seat back, and in which the airbag is prevented from developing toward the occupant of the vehicle seat, and develops in a specific passage extending on the vehicle wall side.

SUMMARY OF THE INVENTION

In order to achieve the above-mentioned object, an airbag according to this invention is arranged inside the side frame on the vehicle wall side, and an expansion restriction plate is provided inside the airbag. Thus, the airbag is sandwiched between the side frame and the expansion restriction plate.

According to one aspect of the embodiment of claim 1, a vehicle seat incorporating a side airbag includes a seat cushion; and a seat back provided at the rear edge of the seat cushion, including a seat back frame which has left and right side frame extending forward, wherein a pad covers the seat back frames, constituting a seat back unit; wherein the seat back unit is entirely covered with a trim cover having sewn parts made by sewing a plurality of trim cover strips; the airbag has an inflator, is secured to the side frame on a vehicle wall side and is incorporated in a side space made in one side of the seat back; if an impact is detected at that side of the seat back, the inflator is activated, generating high-pressure gas, the gas gushes in the airbag, inflating the airbag, and the airbag so inflated tears up the sewn part of the seat back, which are positioned at the front part of the vehicle wall side of the seat back, and develops to the side and front of the occupant, isolating the occupant from the vehicle wall and protecting the occupant; and the airbag is secured to the inner side of the side frame on the vehicle wall side, an expansion restriction plate, which is not integral with the side frame, is provided on the inner side of the air and is arranged to the inner side of the side frame, the airbag is sandwiched between the side frame on the vehicle wall side and the expansion restriction plate, the expansion restriction plate, the airbag and the side frame, in order, are arranged from the inner side of the seat back, and the pad has a guide groove extending to the sewn part of the trim cover on the vehicle wall side; an expansion restriction cloth strip covers the airbag entirely, is held and extending in the guide groove, and is incorporated in the sewn part of the trim cover at the exit of the guide groove; and the expansion restriction cloth strip controls the port through which the airbag develops.

According to Claim 1 of this application, the airbag is secured to the inner surface of the side frame on the vehicle wall side. The left and right sides of the seat back can have the same shape. Hence, there is no difference between the left and right sides of the seat back.

Further, the airbag is secured to the inner surface of the side frame on the vehicle wall side and an expansion restriction plate is provided inside the airbag. Therefore, the airbag is controlled (or interrupted) by the expansion restriction plate, and does not develop toward the occupant. Instead, the airbag develops in a specific passage that extends to the sewn parts of the trim cover, which are positioned at the front part of one side of the seat back.

BRIEF DESCRIPTION OF THE DRAWINGS

FIG. 1 also shows the airbag incorporated in the vehicle seat and the structure holding the airbag;

FIG. 4 corresponds to FIG. 2.

In one aspect of the embodiment, a vehicle seat incorporating a side airbag includes a seat cushion; and a seat back provided at the rear edge of the seat cushion, including a seat back frame which has left and right side frame extending forward, wherein a pad covers the seat back frames, constituting a seat back unit; wherein the seat back unit is entirely covered with a trim cover having sewn parts made by sewing a plurality of trim cover strips; the airbag has an inflator, is secured to the side frame on a vehicle wall side and is incorporated in a side space made in one side of the seat back; if an impact is detected at that side of the seat back, the inflator is activated, generating high-pressure gas, the gas gushes in the airbag, inflating the airbag, and the airbag so inflated tears up the sewn part of the seat back, which are positioned at the front part of the vehicle wall side of the seat back, and develops to the side and front of the occupant, isolating the occupant from the vehicle wall and protecting the occupant; and the airbag is secured to the inner side of the side frame on the vehicle wall side, an expansion restriction plate, which is not integral with the side frame, is provided on the inner side of the airbag and is arranged to the inner side of the side frame, the airbag is sandwiched between the side frame on the vehicle wall side and the expansion restriction plate, the expansion restriction plate, the airbag and the side frame, in order, are arranged from the inner side of the seat back, and the pad has a guide groove extending to the sewn part of the trim cover on the vehicle wall side; an expansion restriction cloth strip covers the airbag entirely, is held and extending in the guide groove, and is incorporated in the sewn part of the trim cover at the exit of the guide groove; and the expansion restriction cloth strip controls the port through which the airbag develops.

DETAILED DESCRIPTION OF THE INVENTION

Embodiment 1

Figure 1:
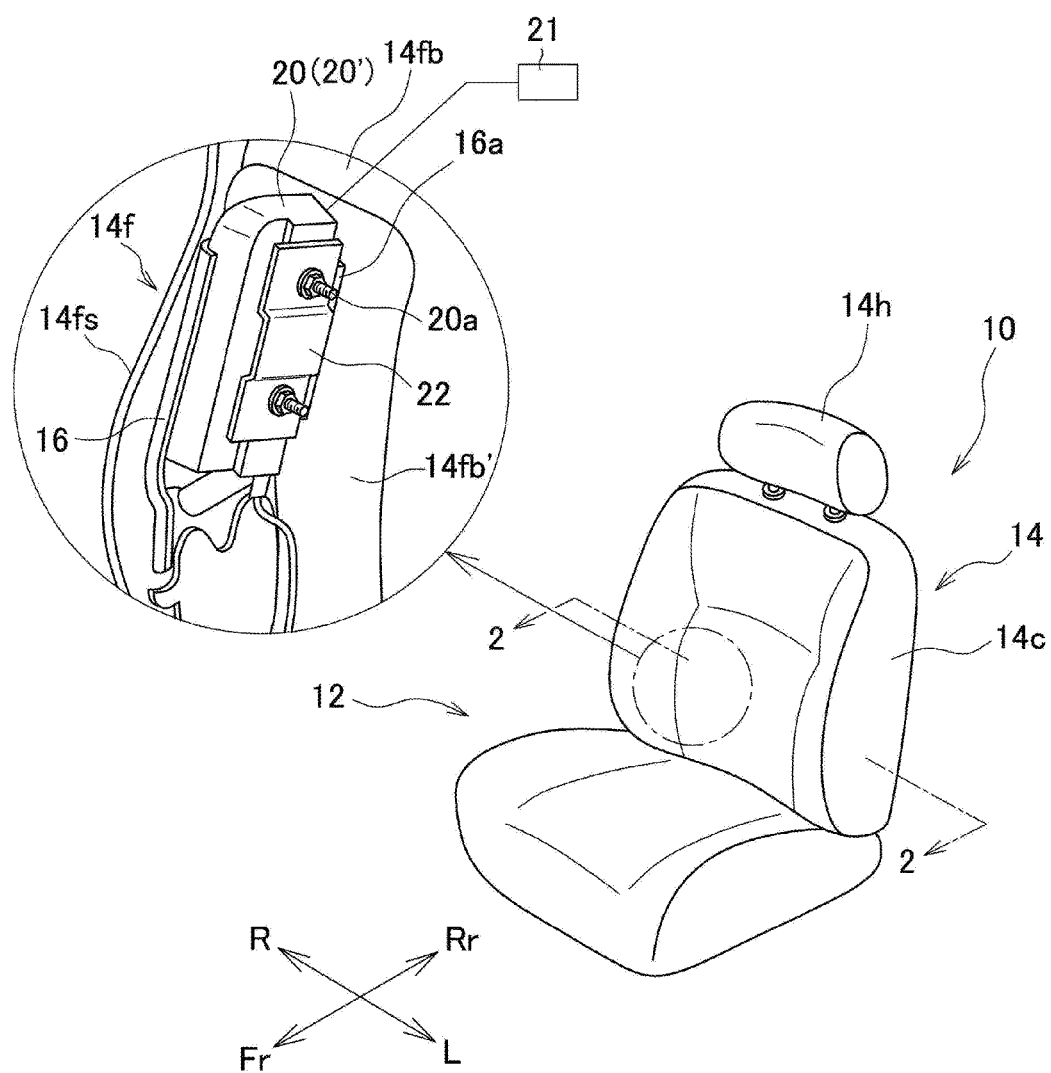
FIG. 1 is a perspective view of a vehicle seat according to one embodiment (i.e., Embodiment 1) of this invention, which incorporates a side airbag.
Figure 2:
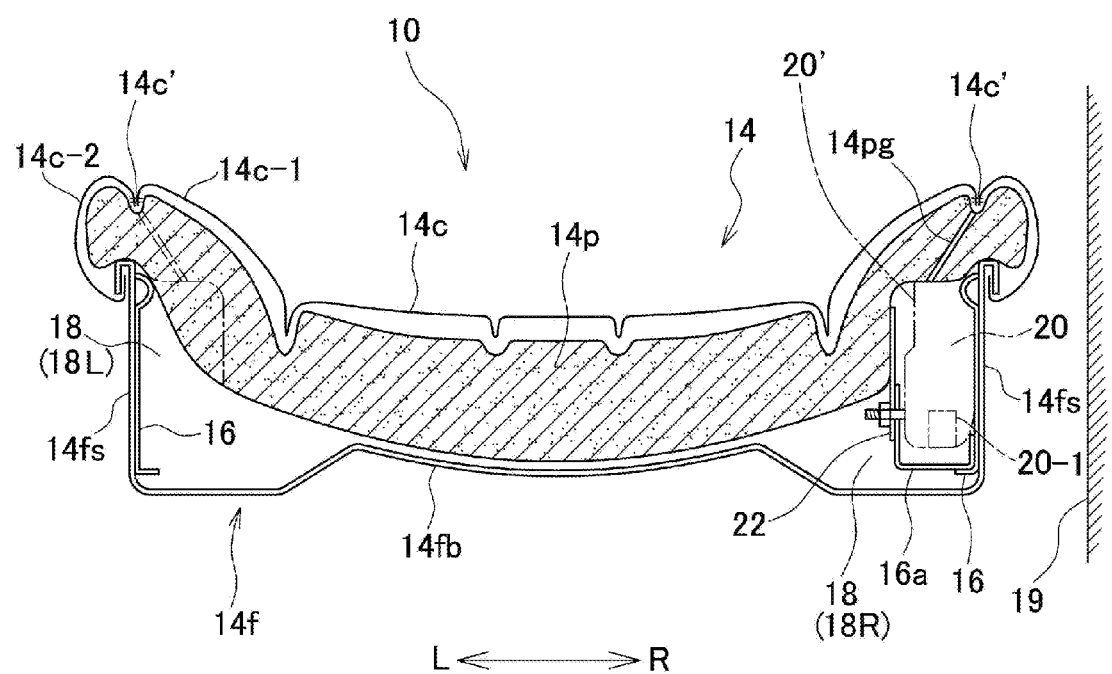
FIG. 2 is a transverse sectional view of the seat back, taken along line A-A shown in FIG. 1.

Embodiments of this invention will be described in detail, with reference to the accompanying drawings. FIG. 1 is a perspective view of a vehicle seat according to one embodiment (i.e., Embodiment 1) of this invention, which incorporates a side airbag. FIG. 1 also shows the airbag incorporated in the vehicle seat and the structure holding the airbag. FIG. 2 is a transverse sectional view of the seat back, taken along line A-A shown in FIG. 1.

As shown in FIG. 1, a vehicle seat 10 according to Embodiment 1 comprises a seat cushion 12 and a seat back 14 provided at the rear end of the seat cushion. On the top of the seat back, a headrest 14h is provided and can be moved up and down. In most cases, a reclining device (not shown) is arranged between the lower end of the seat back and the rear end of the seat cushion. The seat back 14 can therefore be reclined to the seat cushion.

In FIG. 1, arrows Fr and Rr indicate the forward and rearward directions, and arrows L and R indicate the leftward and rightward directions, with respect to the driver (occupant) seated in the driver seat. The left and right sides of the vehicle seat 10 are, respectively, vehicle wall side and vehicle interior side (occupant side).

The basic structures of the seat cushion 12 and that of the seat back 14 are well known in the art. The structure of the seat back will be described in brief. As seen from FIG. 1 and FIG. 2, a pad (seat pad) 14p made of foam such as urethane foam covers a frame (seat back frame) 14f, i.e., skeleton of the seat back, constituting a seat back unit. The seat back unit is covered with a trim cover (surface sheet) 14c, constituting the seat back. The trim cover 14c is bag shaped and composed of, for example, two trim cover strips (i.e., forward strip 14c-1 and rearward strip 14c-2) which are made of fabric having air permeability and elasticity and which are sewn to each other with the seam margin concealed inside. The trim cover 14c covers the seat back frame 14f and the pad 14p.

The trim cover 14c is so sewn that the sewn parts 14c' of the trim cover strips (i.e., forward strip 14c-1 and rearward strip 14c-2) are positioned at the front part of each side of the seat back 14.

The seat back frame 14f has left and right frames 14fs and a plate-shaped back frame 14fb. The frames 14fs extend forward. The back frame 14fb is substantially rectangle as seen from the front and serves as the back board covering the back of the pad 14p. The left and right frames 14fs and the back frame 14fb are integral with each other and made of fiber-reinforced plastic such as carbon-fiber-reinforced plastic (CFRP). A pair of brackets 16, i.e., left and right brackets, is secured to the inner sides of the left and right side frames 14fs.

In the embodiment, the seat back frame 14f has the back frame 14fb that serves as back board, and the trim cover 14c does not cover the back frame. The side frames 14fs are therefore folded back at front end. Inside the folded parts of the side frames, the rear edge of the trim cover 14c are terminal-processed. The rearward strip 14c-2 is split into left and right parts.

At the left and right sides of the seat back 14, side spaces 18 (18R, 18L) are provided, each between the pad 14p and the inner surface of the bracket 16. The space (i.e., vehicle wall side space) at the side of the seat back adjacent to the vehicle interior side wall (vehicle wall) 19 has a size large enough to incorporate an airbag (i.e. side airbag) 20.

The seat back frame 14f only needs to incorporate the airbag 20, with its side frames 14fs extending forward and holding the airbag 20. The seat back frame 14f is not limited to the structure composed of the left and right side frames 14fs and the substantially rectangle, plate-shaped back frame 14fb served as the back board, which are integral with one another and made of fiber-reinforced plastic. The seat back frame 14f may be a known seat back frame substantially rectangular as seen from the front, such as the seat back frame disclosed in, for example, JP 2009-051480 (see particularly FIG. 2 and FIG. 7). This known seat back frame is composed of left and right side frames made steel plates and extending forward. An upper frame made of a steel pipe is coupled to the upper edges of the left and right side frames, and a lower frame made of a steel plate or a steel pipe is coupled to the lower edges of the left and right side frames. Thus, the known seat back frame is substantially rectangular as seen from the front.

The airbag 20 is arranged and incorporated in the side space at the vehicle wall side of the seat back 14. The basic structure of the airbag 20 is well known in the art, and is not a gist of the present invention. Therefore, the airbag 20 will be described in brief. The airbag 20 incorporates a micro gas generator called inflator 20-1 and is folded in front of the inflator and contained in a substantially rectangular case 20'. An impact sensor 21 is attached to the seat 10. The impact sensor 21 is configured to detect an impact applied to the vehicle side if another vehicle hits the vehicle hits at side. If the impact sensor 21 detects such the impact at the vehicle side, the inflator 20-1 is activated, generating high-pressure gas. The gas gushes in the airbag, inflating the airbag. So inflated, the airbag 20 first breaks the pad 14p in the side space 18 on the vehicle wall side of the seat back, and then tear up the sewn parts 14c' of the trim cover strips on the vehicle side. The airbag then inflates at the vehicle wall side, forward of the occupant. As a result, the airbag 20 develops (swells) forward at the occupant's vehicle wall side. The airbag 20 therefore isolates the occupant from the vehicle wall 19, reducing the impact applied to the occupant and ultimately protecting the occupant.

In this embodiment, the airbag is arranged inside the side frame on the vehicle wall side and an expansion restriction plate 22 is provided inside the airbag. Thus, the airbag is sandwiched between the side frame and the expansion restriction plate.

Figure 3:
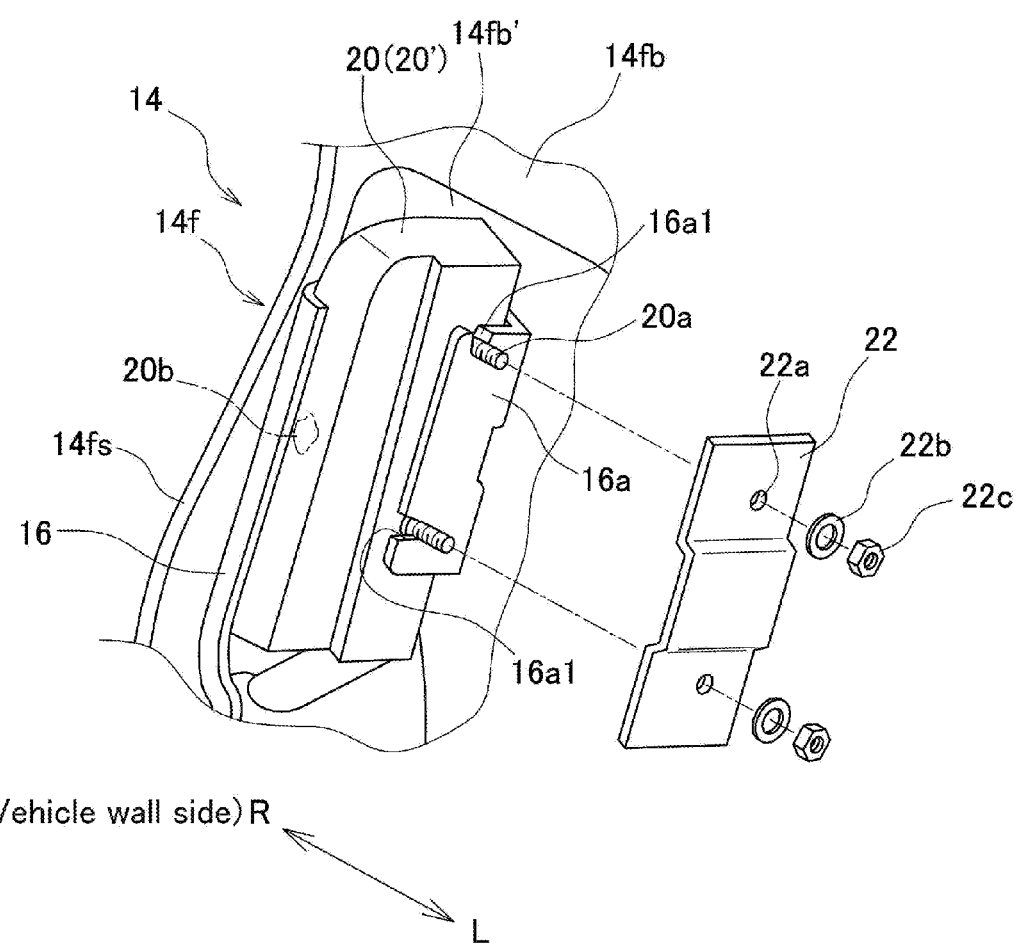
FIG. 3 is an exploded perspective view of the structure holding the airbag incorporated in the vehicle seat.

FIG. 3 is an exploded perspective view of the structure holding the airbag incorporated in the vehicle seat. As seen in FIG. 3, in addition to FIGS. 1 and 2, the bracket 16 includes a holding bracket 16a inside of the bracket. The airbag is secured to the holding bracket and provided on the inner side of the airbag and on the side of the seat back.

For example, the holding bracket 16a having a U-shaped transverse section may be welded to the bracket 16. Alternatively, the bracket 16 may have a U-shaped transverse section and may be formed integral with the holding bracket. The airbag 20 is held among the holding bracket 16a or the bracket 16, both having a transverse section U shaped, and is arranged inside the side frame.

The airbag 20 is contained in the substantially rectangular case 20'. Some fastening screws, for example two screws 20a protrude from the inner surface of the case. The two screws respectively pass through two slits 16a1 which are made in the two ends of the holding bracket 16a and which are spaced apart. As shown in FIG. 3, the two slits 16a1 are made, for example, in the upper and side ends of the holding bracket, respectively, and intersect with each other at an angle of about 90°. Since the two slits intersect with each other at an angle of about 90°, the holding bracket 16a holds the airbag 20 at a prescribed position, preventing the airbag from moving upward, downward, leftward or rightward, once the two screws 20a have been inserted into the slits 16a1, respectively.

A recess 14fb' is made in the front of the plate-shaped back frame (back board) 14fb. In this recess the airbag 20 is arranged (see FIG. 1).

The expansion restriction plate 22 is mounted on the holding bracket 16a and covers the inner surface side of the airbag 20. The expansion restriction plate 22 has, for example, two step parts spaced in the vertical direction, with its middle part raised from the end parts. Two holding holes 22a are made in the upper and lower end parts of the expansion restriction plate 22 and are spaced apart in the vertical direction. The screws 20a pass through the holding holes 22a and washers 22b, respectively, and are set in screw engagement with two hexagonal nuts 22c, respectively. The expansion restriction plate 22 is therefore secured to the inner side of the holding bracket 16a.

In this embodiment, as seen from FIG. 2, the expansion restriction plate 22 covers the inner surface side of the airbag 20 from the rear of the airbag to the front thereof, except the front end of the airbag. Instead, the expansion restriction plate 22 may extend to the front end of the inner surface side of the airbag 20 to cover almost all inner surface side of the airbag in the front-rear direction of the vehicle.

If the impact sensor 21 detects the impact applied from the side and if another vehicle hits the vehicle at that side, the inflator 20-1 is activated, generating high-pressure gas. The gas gushes in the airbag 20, inflating the airbag. So inflated, the airbag 20 breaks the front of the case 20' as shown in FIG. 3, making an opening 20b (indicated by one-dot, dashed line) in that part of the case, which is substantially middle in the vertical direction. The opening 20b gradually increase in size as the airbag develops (swells). As shown in FIG. 2, the two sewn parts 14c' of the trim cover 14c (i.e., forward strip 14c-1 and rearward strip 14c-2) are positioned forwards at the side of the seat back 14. The airbag 20 therefore first breaks the pad 14p and then tear up the sewn parts 14c' on the vehicle side. As a result, the airbag 20 further develops from the side space 18 on the vehicle wall side of the seat back, to the side and front of the occupant. The airbag therefore isolates the occupant from the vehicle wall 19, protecting the occupant.

The pad 14p has a guide groove 14pg. The guide groove 14pg extends from the front center part of the airbag, which faces the opening 20b, to the sewn parts 14c' of the trim cover on the vehicle wall side, which are positioned forwards at the side of the seat back 14. Therefore, a passage (i.e., development passage) for the airbag 20 can therefore be easily provided on the vehicle wall side, extending to the sewn part on the vehicle wall side 14c' along the guide groove 14pg.

In this embodiment, the airbag 20 is arranged on the inner side of the side frame 14fs. Hence, the airbag 20 may develop not on the vehicle wall side, but on the occupant side away from the vehicle wall (namely, on the vehicle inner side). Nonetheless, the expansion restriction plate 22 is provided on the inner side of the airbag 20, and the airbag is sandwiched between the side frame and the expansion restriction plate. The airbag 20 is therefore controlled (or interrupted) by the expansion restriction plate 22, and cannot develop toward the occupant. Instead, the airbag 20 develops in the specific passage that extends to the sewn part 14c' along the guide groove 14pg.

As the airbag 20 develops, a large pushing force is applied to the expansion restriction plate 22. The pushing force may deform the expansion restriction plate. However, the expansion restriction plate withstands the pushing force and is not deformed. This is because the expansion restriction plate 22 has two step parts spaced in the vertical direction, with its middle part raised from the end parts, and is thereby reinforced. Since the expansion restriction plate 22 withstands the pushing force and is not deformed, it reliably prevents the airbag from developing toward the occupant.

The expansion restriction plate 22 may better be reinforced. The method of reinforcing it need not be limited to forming step parts, nevertheless. For example, the expansion restriction plate may have rib-shaped projections that extend parallel to one another.

The side frame 14fs on the vehicle wall side prevents the airbag from developing toward the vehicle side wall. On the vehicle wall side, the airbag 20 never develops toward the vehicle wall 19, except in the specific passage extending to the sewn part 14c' along the guide groove 14pg.

It is desired that the pad 14p on the left side of the seat back may be cut in the back as indicated by the one-dot, dashed line indicates in FIG. 2, thereby to provide a left-side space 18 for holding an airbag 20 in addition to the right-side space (i.e., space on the vehicle wall side). If the pad 14p is so cut, the airbag 20 may be held in either the left-side space 18L or the right-side spaces 18R. In this case, the seat 10 can be used as a vehicle seat arranged on the right side in the vehicle (e.g., driver's seat) or as a vehicle seat arranged on the left side in the vehicle (e.g., assistant's seat).

Since the airbag 20 is provided on the inner side of the side frame 14fs, the seat back will not bulge at one side even if the trim cover 14c covers the side frame on the vehicle wall side. The left and right parts of the seat back can have the same shape, though the airbag is provided on only the right side of the seat back, in this embodiment. Hence, no design difference is observed between the left and right sides of the seat back.

Embodiment 2

Figure 4:
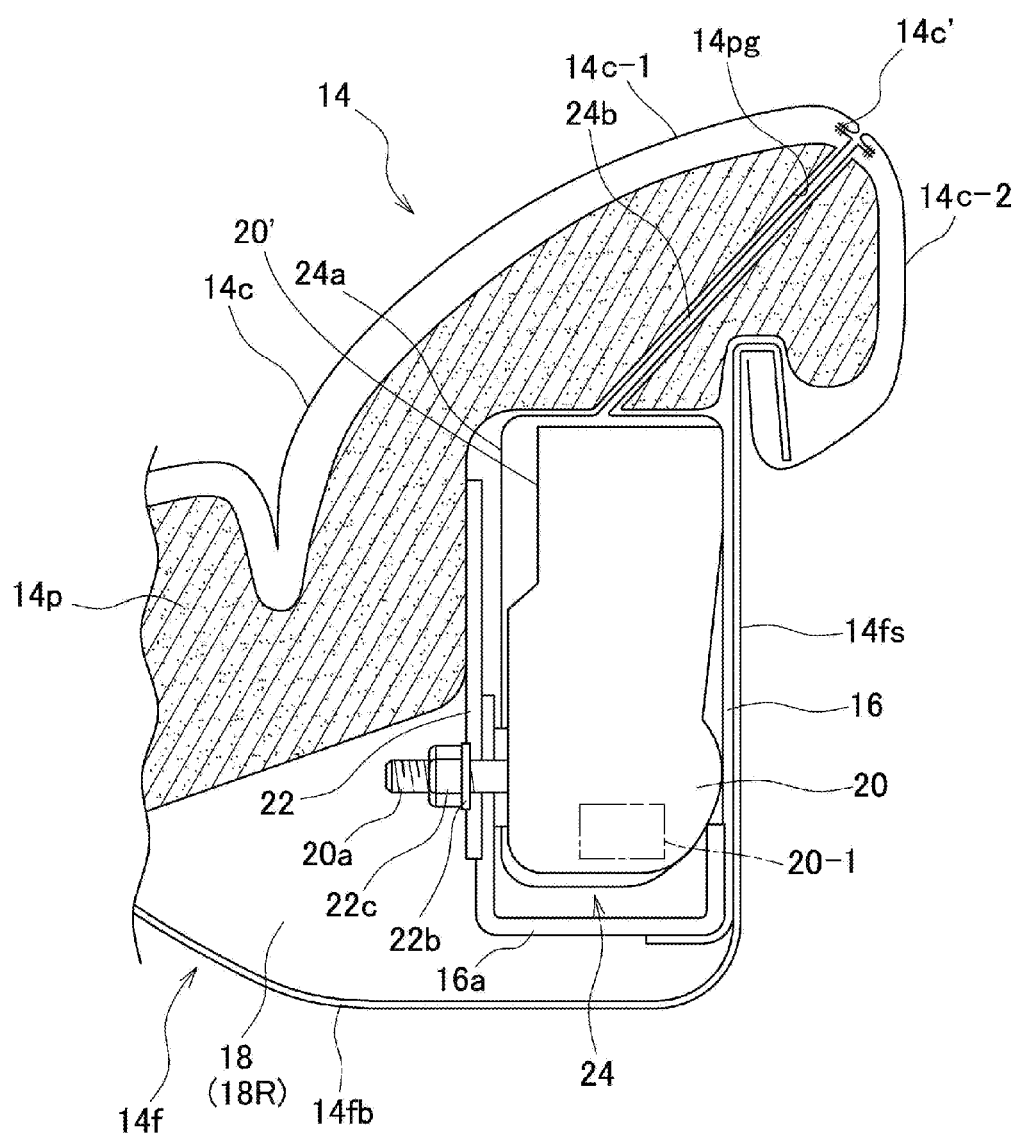
FIG. 4 is a partial transverse sectional view of the seat back of a vehicle seat according to another embodiment (i.e., Embodiment 2) of this invention, which vehicle seat incorporates a side airbag.

FIG. 4 is a partial transverse sectional view of the seat back of a vehicle seat according to another embodiment (i.e., Embodiment 2) of this invention, which vehicle seat incorporates a side airbag. FIG. 4 corresponds to FIG. 2.

FIG. 4 shows another embodiment (Embodiment 2) of this invention. In FIG. 4, the components identical to those of the embodiment described above (i.e., Embodiment 1) are designated by the same reference numbers. Only the components different from those used in Embodiment 1 will be described in the main. In Embodiment 2, an expansion restriction cloth strip controls the port through which the airbag develops. In any other respects, Embodiment 2 is identical to Embodiment 1 in terms of configuration.

As shown in FIG. 4, the expansion restriction cloth strip 24 includes a main part 24a and a conduit part 24b. The main part 24a is bag shaped and made by sewing pieces together, and covers the airbag 20 entirely. The conduit part 24b has two ends. One end passes in the front of the main part. The other end is housed in the guide groove 14pg of the pad, extends to the sewn parts 14c' of the trim cover on the vehicle side and is incorporated in the trim cover 14c. Therefore, the conduit part 24b and the guide groove 14pg are both opening to the sewn part 14c' of the trim cover on the vehicle side.

It is desirable to form the main part 24a and conduit part 24b of the expansion restriction cloth strip 24, integral with each other. Nonetheless, they may be formed individually and then be firmly sewn to each other, producing the expansion restriction cloth strip. The expansion restriction cloth strip 24 may be made of cloth strong enough to control (interrupt) the developing of the airbag when the airbag 20 is inflated (swollen) with high-pressure gas and weak enough to tear up if the pad 14p is broken. The expansion restriction cloth strip 24 may be made of, for example, reinforced cloth.

A piece of reinforced cloth may be sewn, forming a cloth bag, i.e., a main part 24a covering the airbag 20 entirely. Further, an elongate piece of reinforced cloth is sewn, forming a conduit part 24b that is a hollow cylinder continuous to the main part 24a. The conduit part is fitted in the guide groove 14pg, without leaving a wide gap between it and the guide groove. The conduit part 24b communicates at one end with the front of the main part 24a, and is sewn at the other end to, for example, the forward strip 14c-1 and rearward strip 14c-2 of the trim cover 14c. The expansion restriction cloth strip 24 is thereby formed. In another word, the forward strip 14c-1 and rearward strip 14c-2 of the trim cover 14c are sewn together with the other end of the conduit part 24b clamped between them, and the sewn part 14c' of the trim cover on the vehicle side is connected to the other end of the conduit part.

As seen from FIG. 4, the airbag 20 is covered with the main part 24a of the expansion restriction cloth strip and held among the holding bracket 16a.

Thus, the main part 24a of the expansion restriction cloth strip covers the airbag 20 entirely, and the one end of the conduit part 24b communicates with the front of the main part 24a. Further, the other end of the conduit part 24b is housed in the guide groove 14pg of the pad, extended and incorporated in the sewn part 14c' on the vehicle wall side, and the expansion restriction cloth strip 24 restricts the port through which the airbag 20 develops. Hence, the expansion restriction cloth strip 24 controls (or interrupts) the free development of the airbag 20 being inflated (swollen) with the high-pressure gas. The airbag 20 therefore develops along the guide groove 14pg, in a specific passage extending to the sewn part 14c' on the vehicle wall side.

In Embodiment 2, an expansion restriction plate 22 is provided inside the airbag 20 and the airbag is sandwiched between the expansion restriction plate and the side frame 14fs on the vehicle wall side, as in the vehicle seat of Embodiment 1. The expansion restriction plate 22 therefore controls (or interrupts), preventing the airbag 20 from developing toward the occupant. Thus, the airbag 20 does not develop toward the occupant, but develops in a specific passage which extends to the sewn part 14c' and is provided on the vehicle wall side.

In Embodiment 2, the expansion restriction plate 22 is provided inside the airbag 20 and the expansion restriction cloth strip 24 controls the port through which the airbag develops. The expansion restriction plate 22 and the expansion restriction cloth strip 24 controls (or interrupts) the airbag 20, preventing the same from developing toward the occupant. The airbag 20 therefore reliably develops in the specific passage which extends to the sewn parts 14c' and is provided on the vehicle wall side.

As described above, the airbag is provided on the inner side of the side frame on the vehicle wall side. The left and right parts of the seat back can therefore have the same shape. No design difference is therefore made between the left and right sides of the seat back.

Indeed the airbag is provided on the inner side of the side frame on the vehicle wall side. However, the expansion restriction plate is provided on the inner side of the airbag. Therefore, the expansion restriction plate controls (or interrupts) the airbag, preventing the same from developing toward the occupant. The airbag develops in a specific passage which extends to the sewn part of the trim cover and is provided on the vehicle wall side.

The embodiments have been described to explain this invention, and are not intended to limit the scope of the invention. Accordingly, various changes and modifications may be made within the spirit or scope of this invention, and are of course included in this invention.

INDUSTRIAL APPLICABILITY

This invention can be applied to various seats, each incorporating an airbag (side airbag) in the vehicle wall side of the seat back. The invention can be applied not only to vehicle seats for use in vehicles, trucks and buses, but also to any seat that reduces the impact applied to its side, thereby to protect the occupant, such as seats for use in trains and aircraft.

What is claimed is:

1. A vehicle seat incorporating a side airbag, comprising:
a seat cushion; and
a seat back provided at the rear edge of the seat cushion, including a seat back frame which has left and right side frames extending forward, wherein a pad covers the seat back frames, constituting a seat back unit;
wherein the seat back unit is entirely covered with a trim cover having sewn parts made by sewing a plurality of trim cover strips;
the airbag has an inflator, is secured to the side frame on a vehicle wall side and is incorporated in a side space made in one side of the seat back;
if an impact is detected at that side of the seat back, the inflator is activated, generating high-pressure gas, the gas gushes in the airbag, inflating the airbag, and the airbag so inflated tears up the sewn part of the seat back, which are positioned at the front part of the vehicle wall side of the seat back, and develops to the side and front of the occupant, isolating the occupant from the vehicle wall and protecting the occupant; and
the airbag is secured to the inner side of the side frame on the vehicle wall side, an expansion restriction plate, which is not integral with the side frame, is provided on the inner side of the airbag and is arranged to the inner side of the side frame, the airbag is sandwiched between the side frame on the vehicle wall side and the expansion restriction plate, the expansion restriction plate, the airbag and the side frame, in order, are arranged from the inner side of the seat back, and
the pad has a guide groove extending to the sewn part of the trim cover on the vehicle wall side; an expansion restriction cloth strip covers the airbag entirely, is held and extending in the guide groove, and is incorporated in the sewn part of the trim cover at the exit of the guide groove; and the expansion restriction cloth strip controls the port through which the airbag develops.

2. The vehicle seat incorporating a side airbag, according to claim 1, wherein the expansion restriction cloth strip includes a main part and a conduit part which are formed integral; the main part is bag shaped and covers the airbag entirely; and the conduit part has two ends, one end passing in the front of the main part, and the other end housed and extending in the guide groove of the pad and incorporated in the sewn part of the trim cover.

* * * * *